US007669707B2

(12) United States Patent
Kenneway

(10) Patent No.: US 7,669,707 B2
(45) Date of Patent: Mar. 2, 2010

(54) MATERIAL HANDLING APPARATUS WITH INTEGRATED PART SORTER

(75) Inventor: Ernest K. Kenneway, Ada, MI (US)

(73) Assignee: Dunkley International, Inc., Kalamazoo, MI (US)

( * ) Notice: Subject to any disclaimer, the term of this patent is extended or adjusted under 35 U.S.C. 154(b) by 916 days.

(21) Appl. No.: 11/478,283

(22) Filed: Jun. 29, 2006

(65) Prior Publication Data

US 2008/0000816 A1 Jan. 3, 2008

(51) Int. Cl.
*B65G 29/00* (2006.01)

(52) U.S. Cl. ........................ 198/398; 198/392; 198/393; 198/395; 209/576; 209/919

(58) Field of Classification Search ................. 198/392, 198/393, 395, 398, 443, 444, 502.2, 757; 209/576, 919
See application file for complete search history.

(56) References Cited

U.S. PATENT DOCUMENTS 3,696,924 A 10/1972 Sterling
3,831,734 A 8/1974 Hoppmann et al.
3,870,194 A 3/1975 Taylor
3,900,107 A 8/1975 Hoppmann
3,960,293 A 6/1976 Sweet, II et al.
4,007,854 A 2/1977 Ervine
4,264,202 A 4/1981 Gugliotta et al.
4,333,558 A 6/1982 Nonaka et al.
4,429,808 A 2/1984 Doty
4,503,993 A 3/1985 Ginnow et al.
4,576,286 A 3/1986 Buckley et al.
4,608,646 A 8/1986 Goodrich et al.
4,709,798 A 12/1987 Herzog
4,921,106 A * 5/1990 Spatafora et al. ............ 209/539
4,938,082 A 7/1990 Buckley et al.
5,311,977 A 5/1994 Dean et al.
5,554,031 A 9/1996 Moir et al.
5,853,078 A 12/1998 Kneubuhler
5,906,571 A 5/1999 Neber
5,927,467 A 7/1999 Spatafora
5,954,185 A 9/1999 Eshelman et al.
6,216,845 B1 4/2001 Polese
6,311,825 B1 11/2001 Schmitt (Continued)

FOREIGN PATENT DOCUMENTS

JP 405319549 A 12/1993

(Continued)

*Primary Examiner*—Douglas A Hess
(74) *Attorney, Agent, or Firm*—Price, Heneveld, Cooper, DeWitt & Litton LLP

(57) ABSTRACT

A material handling apparatus includes a part feeding device such as a bowl feeder with a perimeter track, a second track extending around the perimeter track, a vision inspection system, and an ejector device. The second track has a transparent floor and the vision inspection system includes a controller and at least one camera operably connected to the controller for looking through the transparent floor to identify defective parts. The ejector device is operably connected to the controller for ejecting bad ones of the received parts, the ejector device being located downstream of the cameras. A related method is also provided. The arrangement is very compact, and has a very small foot print, but can operate at speed up to or more than 4000 pieces per minute.

19 Claims, 3 Drawing Sheets

U.S. PATENT DOCUMENTS

| | | | |
|---|---|---|---|
| 6,578,699 | B2 | 6/2003 | Baird et al. |
| 6,701,001 | B1 | 3/2004 | Kenneway et al. |
| 6,805,245 | B2 | 10/2004 | Kenneway |
| 6,995,837 | B1 | 2/2006 | Moir et al. |
| 7,119,299 | B2 * | 10/2006 | Kojima et al. ............... 209/573 |

FOREIGN PATENT DOCUMENTS

| | | | |
|---|---|---|---|
| JP | 406056250 | A | 3/1994 |

* cited by examiner

MATERIAL HANDLING APPARATUS WITH INTEGRATED PART SORTER

BACKGROUND

The present invention relates to material handling apparatus with part recognition and sorting capability, and more particularly relates to a high speed material handling apparatus with part sorter and vision inspection system integrated into the apparatus to provide a compact unit with decreased footprint. However, the present invention is not believed to be limited to only vision inspection systems.

Numerous vibratory, centrifugal and rotary material handling devices are known and publicly/commercially available for singulating and orienting loose randomly-distributed parts for use, such fasteners being fed to an automated machine for installation/assembly. For example, see Doty U.S. Pat. No. 4,429,808. Further, sorting devices are known for ejecting defective parts. A problem is that these machines take up significant floor space, often in areas where floor space is at a premium and expensive. Thus, it is desirable to minimize the footprint (i.e., floor space occupied) of such material handling machines.

Optical object sorting systems are known and can be very useful, since the parts being sorted do not have to be physically contacted. One such system is described in Kenneway U.S. Pat. No. 6,805,245. However, optical systems require spacing of parts in order to facilitate the process of visual inspection. Uniform spacing can be a difficult problem in high speed material handling devices. Notably, spacing of parts can be accomplished in different ways, such as by reciprocating part-blocking gates, a slower upstream conveyor dropping parts onto a faster downstream conveyor, and/or rotating plates that create separation through radial movement of parts into larger circular paths on plates (e.g., through use of centrifugal force mechanisms). However, each of these alternatives take up additional floor space and involve additional mechanisms with an associated increase in complexity of the equipment, such that they are undesirable.

Thus, a system having the aforementioned advantages and solving the aforementioned problems is desired.

SUMMARY OF THE PRESENT INVENTION

In one aspect of the present invention, a material handling apparatus is provided for singulating, orienting, and delivering parts to a downstream location for use. The apparatus includes a part feeding device with a perimeter track, a second track extending around the first track, a vision inspection system, and an ejector device. The part feeding device has a bowl around which the perimeter track extends for singulating, orienting and delivering oriented parts from a supply of loose non-aligned parts in the bowl along the perimeter track to a first output location. The second track is attached to the bowl feeder and includes a transparent floor extending at least partially around the perimeter track. The second track is configured to receive the oriented parts from the first output location and convey the received parts across the transparent floor to a second output location. The vision inspection system includes a controller and at least one camera operably connected to the controller, at least one of the cameras being oriented to look through the transparent floor and the controller being programmed to identify defective ones of the received parts based on information from the at least one camera.

In another aspect of the present invention, a method of material handling includes steps of providing a part feeding device having a bowl and perimeter track, and using the part feeding device to singulate, orient and deliver oriented parts from a supply of loose non-aligned parts in the bowl along the perimeter track to a first output location. The method also includes providing a second track with a transparent wall portion extending at least partially around the perimeter track, and receiving the oriented parts from the first output location and conveying the received parts across the transparent wall portion to a second output location. The method still further includes providing a vision inspection system with a controller and one or more cameras operably connected to the controller, and orienting the cameras to look through the transparent wall portion and programming the controller to identify defective ones of the received parts. The method also includes ejecting defective ones of the received parts downstream of the cameras.

In still another aspect of the present invention, a material handling apparatus includes a bowl feeder for singulating, orienting and delivering oriented parts from a supply of loose non-aligned parts, an inspection/sorting system attached to the bowl feeder, the system including a transparent track member for carrying oriented parts around the bowl feeder and including at least one camera pointed at the transparent member for viewing parts, and an ejector device operably connected to a controller that interprets data from the at least one camera and that is configured to eject bad ones of the received parts based on signals from the controller.

In yet another aspect of the present invention, a method of material handling includes steps of providing a feeding device with a perimeter track; singulating, orienting and delivering oriented parts along the perimeter track to a first output location; and then inspecting the oriented parts with a vision inspection system that directs the oriented parts along a path parallel to but outboard of the perimeter track.

These and other aspects, objects, and features of the present invention will be understood and appreciated by those skilled in the art upon studying the following specification, claims, and appended drawings.

DESCRIPTION OF PRIOR ART

Figure 4:
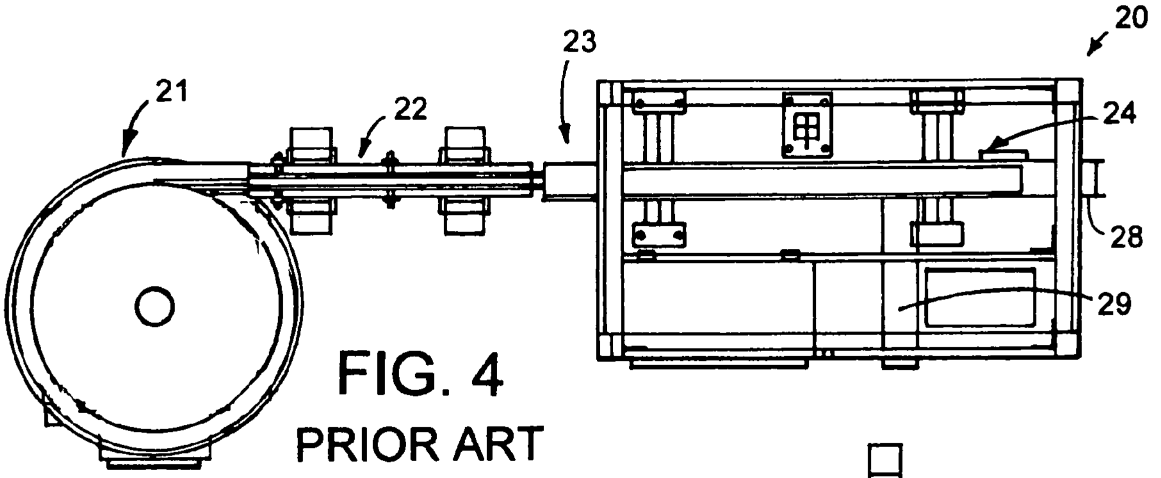
FIG. 4 PRIOR ART
FIGS. 4-5 are plan and elevational views of a prior art material handling apparatus.
Figure 5:
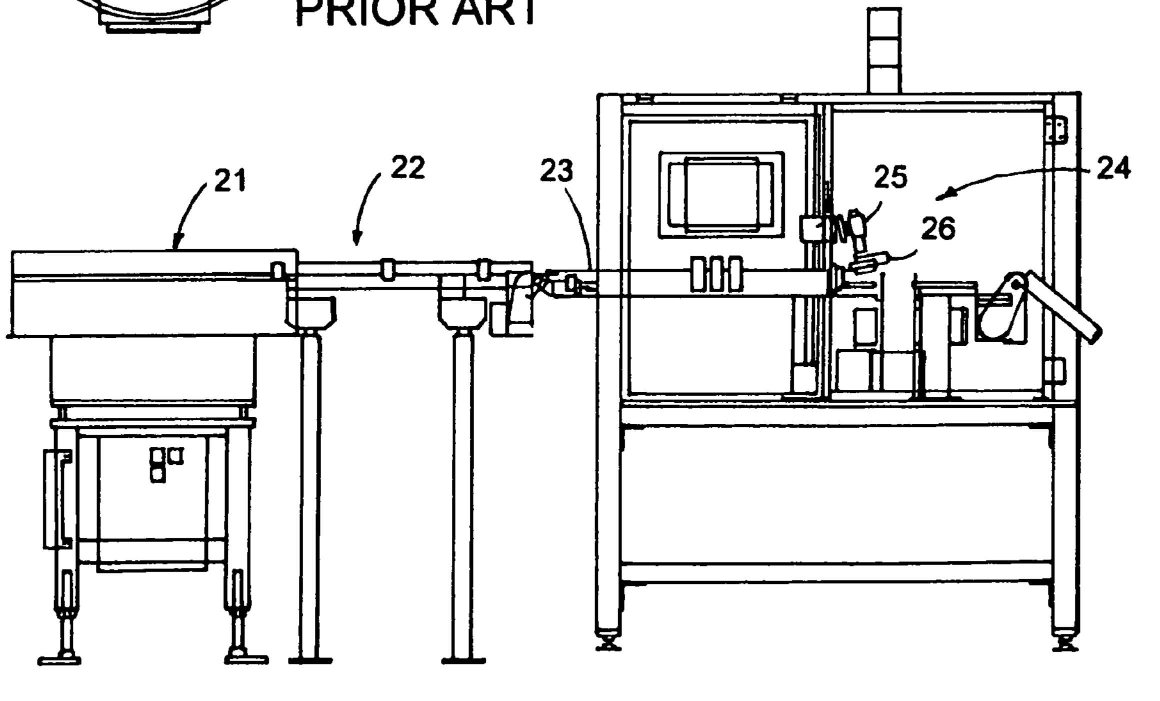
FIG. 5 PRIOR ART

A prior art material handling apparatus 20 (FIGS. 4-5) includes a bowl feeder 21 for singulating and orienting parts (such as fasteners), a take-away conveyor 22, a faster second conveyor 23 for spacing the singulated/oriented parts, and a visual inspection station 24 with cameras 25-26, a controller operably connected to the cameras, a “good part” chute 28, and an ejector for ejecting parts out a defective part chute 29. See also Kenneway U.S. Pat. Nos. 6,805,245 and 6,701,011, and also Doty U.S. Pat. No. 4,429,808.

DETAILED DESCRIPTION OF PREFERRED EMBODIMENTS

Figure 1:
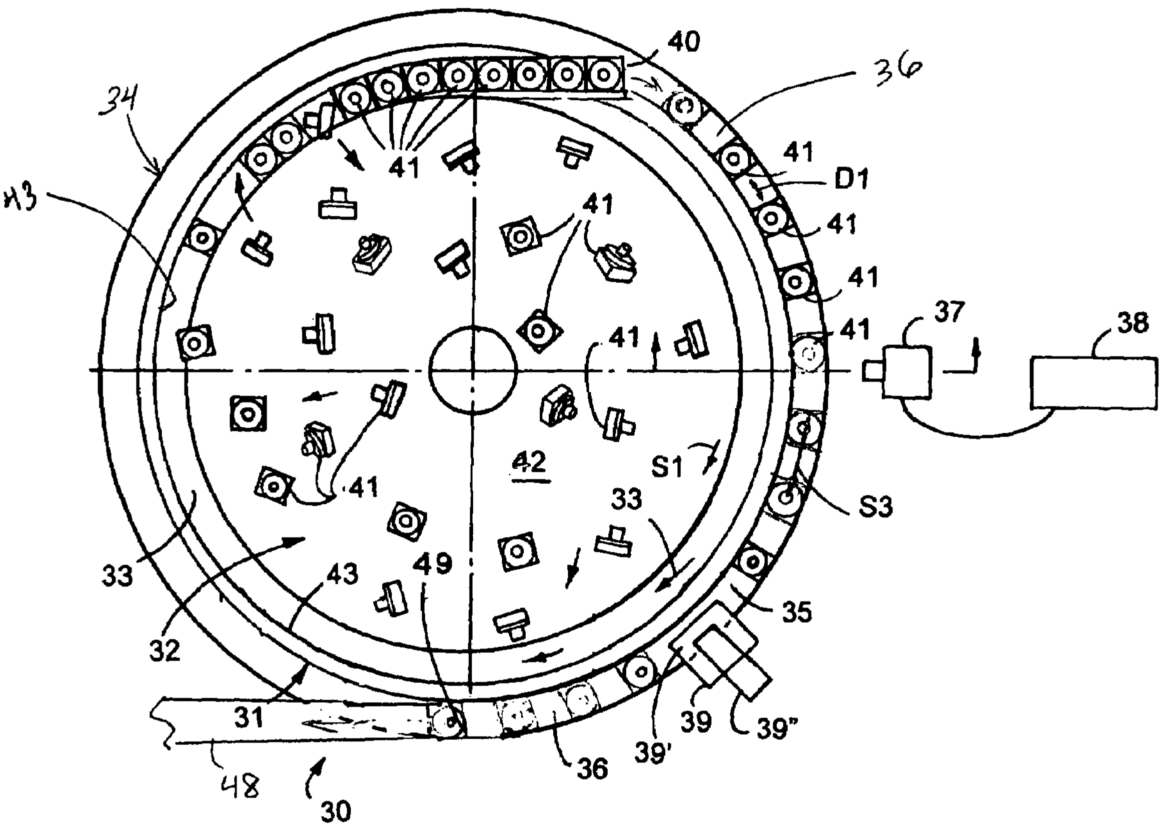
FIGS. 1-3 are top and side views and an enlarged fragmentary end view of a material handling apparatus embodying the present invention.

A material handling apparatus 30 (FIG. 1) includes a part feeding device such as the illustrated bowl feeder 31 with supply bowl 32 and a perimeter track 33. A ring 34 is rotatably supported for rotation about the perimeter track 33. The ring 34 defines a second track 35 extending around the perimeter track 33, the ring 34 including a transparent floor 36 and (potentially) a transparent outer side wall 36'. A vision inspection system includes cameras 37 operably connected to a controller 38 for inspecting the parts as they pass along the transparent floor over the cameras 37. An ejecting device 39 is positioned along the second track 35 downstream of the cameras 37, and is operably connected to the controller 38 for ejecting defective parts.

The apparatus 30 includes a frame 30' and machine controls 30" as appropriate, depending on the sophistication of the control equipment required. By rotating the ring 34 slightly faster than the track 33 (which track 33 may be stationary or may itself move at a predetermined rotational rate), parts 41 become slightly spaced apart a distance D1 as they move onto the ring 34 from output location 40, allowing for clear viewing by the cameras 37. Since the ring 34 extends around the bowl 31, the arrangement is very compact and the apparatus 30 has a very small foot print. Nonetheless, the present material handling apparatus 30 when used for handling bolts, nuts, fasteners and the like can operate at speed up to or more than 4000 pieces per minute.

The disclosure below is intended to be and is believed to be complete and sufficient to provide to a person skilled in the art with an enabling disclosure and a best mode. Nonetheless, the reader is referred to the disclosure in co-assigned Kenneway U.S. Pat. Nos. 6,805,245 and 6,701,001 for additional information on object sorting systems and automated part sorting systems, including vision recognition systems. Also, see Doty U.S. Pat. No. 4,429,808 for additional disclosure and teaching on part sorters/feeders. The entire contents and teachings of these three patents are incorporated herein in their entirety.

The illustrated bowl feeder (31) is exemplary of those manufactured by Moorfeed company. It is a centrifugal-type sorter/feeder machine where parts 41 (e.g., fasteners) are dumped into a center of the bowl 31 and then singulated and oriented as they are fed by centrifugal force on a rotating plate to a perimeter track 33 where they are oriented (i.e. bumped from the track if improperly oriented) and then to an output location 40. It is specifically contemplated that the present invention can be used on a wide variety of different part feeder apparatus, even though only a particular one is shown, such as a vibratory-type sorter/feeder machine. Accordingly, the present disclosure is not intended to be unduly limited to only the feeder shown. The illustrated bowl feeder 31 has a supply bowl 32 with a bottom plate 42 on which loose randomly-oriented supply of parts 41 are supported. An outer wall 43 extends around the plate 42 and includes flanges forming a perimeter track 33 suitable for engaging and causing the parts 41 to singulate and orient as they travel along the perimeter track 33. The details of the track 33 are not illustrated, however a wide variety of such tracks are well known in the art and are in the public domain. The particular illustrated part 41 is a headed threaded bolt with square washer and round washer on its head. It is shown on the track 33 (and on track 35) with its head squarely supported on the floor of the track with its threaded shaft extending upwardly. However, it is contemplated that the part 41 can be held in different orientations and that the part 41 can be any of a number of different items, and that the tracks 33 and 35 can be made to accommodate, singulate, orient and sequentially feed any such parts. The point is that parts are singulated and oriented such that they form a line of parts stacked up against the output location 40 as they are ready for further processing.

Figure 3:
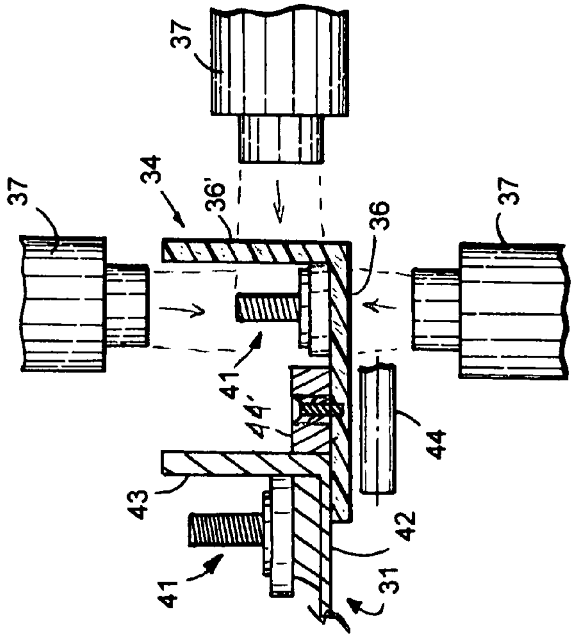

The ring 34 is rotatably supported for rotation about the perimeter track 33, and it is noted that this support can be provided by a number of different means. The illustrated arrangement includes rollers or bearings 44 and 44' (FIG. 3) that support the ring 34 at multiple locations around the bowl 32. At least one of the rollers 44 is driven, or alternatively, the ring 34 is connected by gears to the drive for the perimeter track 33 (presuming that the perimeter track 33 is also driven for rotation). The ring 34 defines a second track 35 extending around the perimeter track 33, and includes a transparent floor 36 made of glass (potentially tempered glass) or other tough wear-resistant material. The material of the bowl 32 and ring 34 is determined by the functional requirements of its application. In other words, steel fasteners such as nuts, bolts, and the like will require a tough scratch-resistant material such as tempered glass, while softer product such as fruit, cherries or the like will potentially allow use of a softer sterilizable material. It is noted that the floor 36 of the perimeter track 33 can be entirely transparent, or it may include windows of glass positioned in a floor at locations where it is known that the parts 41 will be (such as when pockets are provided for positive location of the parts 41).

Figure 2:
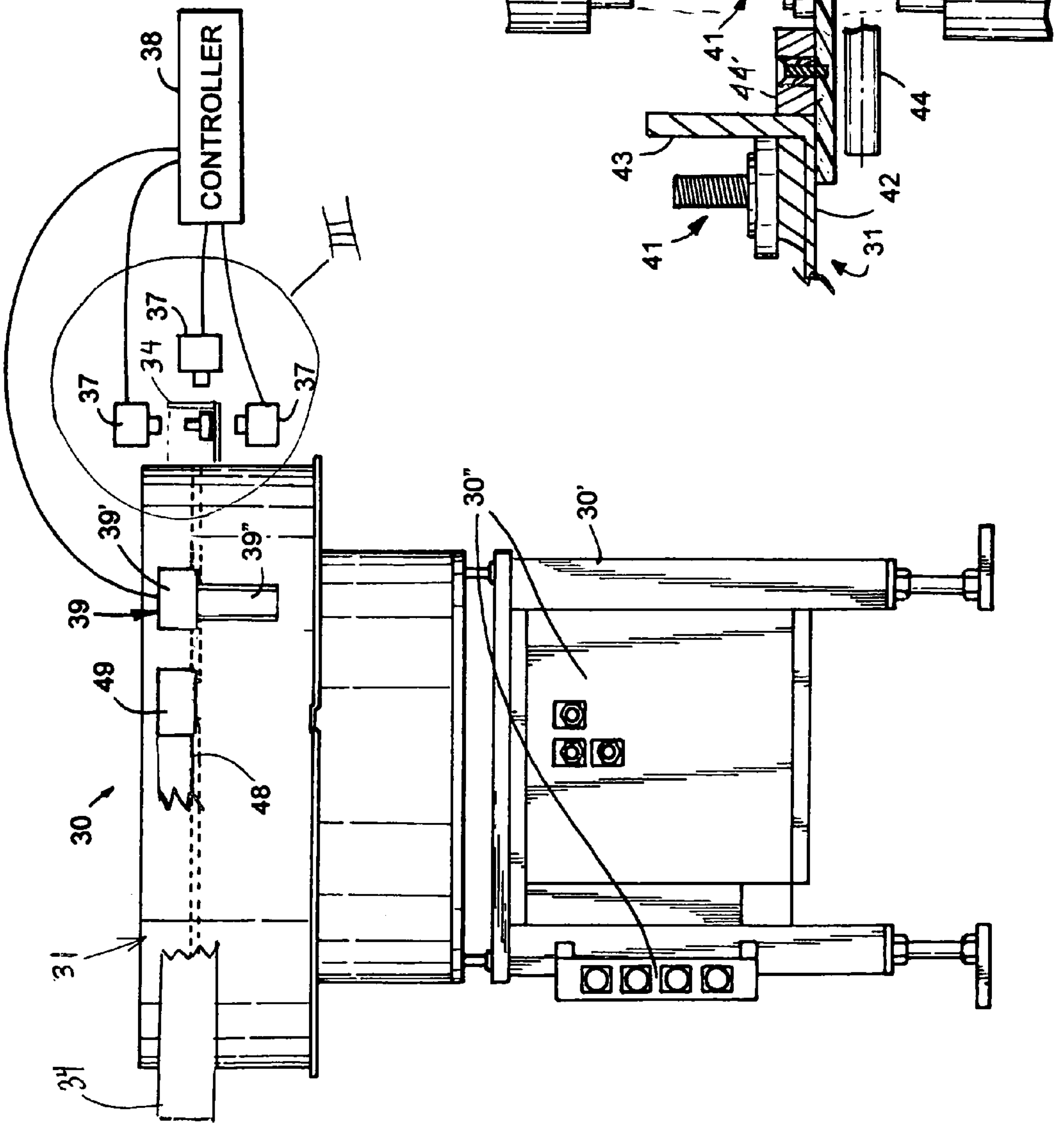

The vision inspection system includes cameras 37 (FIG. 2) operably connected to a controller 38 for inspecting the parts 41 as they pass along the transparent floor 36 over the cameras 37. An ejecting device 39 is positioned along the second track 35 downstream of the cameras 37, and includes a plunger 39' operably connected to the controller 38 for ejecting defective parts down a chute 39". Good parts slide down and out of a secondary output chute 48, motivated by a pusher 49, if necessary, with the chute 48 being configured to maintain a particular orientation of the parts for later use. The material handling apparatus for handling bolts, nuts, fasteners and the like can operate at speed up to or more than 4000 pieces per minute.

It is to be understood that variations and modifications can be made on the aforementioned structure without departing from the concepts of the present invention, and further it is to be understood that such concepts are intended to be covered by the following claims unless these claims by their language expressly state otherwise.

The embodiments of the invention in which an exclusive property or privilege is claimed are defined as follows:

1. A material handling apparatus for singulating, orienting, sorting and delivering parts to a downstream location for use; comprising:

a part feeding device having a bowl and perimeter track for singulating, orienting and delivering oriented parts from a supply of loose non-aligned parts in the bowl along the perimeter track to a first output location for exiting the apparatus;

a second track with a transparent floor extending at least partially around the perimeter track, the second track being configured to receive the oriented parts from the first output location and convey the received parts across the transparent floor to a second output location for exiting the apparatus; and a vision inspection system including a controller and at least one camera operably connected to the controller, at least one of the cameras being oriented to look through the transparent floor and the controller being programmed to identify defective ones of the received parts based on information from the at least one camera.

2. The apparatus of claim 1, including an ejector device operably connected to the controller for ejecting bad ones of the received parts, the ejector device being located downstream of the cameras and being configured to dispose of the bad ones of the received parts.

3. The apparatus of claim 1, wherein the second track operates at a higher speed of part flow and is configured to increase a space between the received parts.

4. The apparatus of claim 1, wherein the second track rotates.

5. The apparatus of claim 1, wherein the perimeter track and second track cooperate and have coordinated different speeds so that the spacing of the received parts on the second track is uniform.

6. The apparatus of claim 5, wherein the bowl comprises a vibrating bowl and includes a vibrator mechanism for vibrating the bowl to motivate the loose non-aligned parts onto the perimeter track.

7. The apparatus of claim 1, wherein the second track extends completely around the perimeter track.

8. The apparatus of claim 1, wherein the second track also includes a wall that is transparent, and wherein at least another one of the cameras is oriented toward the transparent wall.

9. The apparatus of claim 1, wherein the entire floor is a transparent glass material.

10. The apparatus of claim 1, including an ejector device, and wherein the part feeding device, the second track, the vision inspection system and the ejector device each are configured to operate at at least 1000 pieces per minute.

11. The apparatus of claim 10, wherein the part feeding device, the second track, the vision inspection system and the ejector device are each configured to operate at at least 2000 pieces per minute.

12. The apparatus of claim 11, wherein the part feeding device, the second track, the vision inspection system and the ejector device are each configured to operate at at least 4000 pieces per minute.

13. The apparatus of claim 1, wherein the floor is made in part of tempered glass.

14. The apparatus of claim 1, wherein the part feeding devices delivers the oriented parts along a continuous line in an aligned longitudinally-spaced-apart arrangement.

15. The apparatus of claim 1, wherein the cameras include at least two cameras facing in non-parallel directions.

16. A method of material handling comprising steps of:

providing an apparatus including a feeding device with a perimeter track;

singulating, orienting and delivering oriented parts along the perimeter track to a first output location; and inspecting the oriented parts with a vision inspection system that directs the oriented parts along a path parallel to but outboard of the perimeter track; and providing on the apparatus both a first output location for good parts exiting the apparatus and also a second output location for bad parts exiting the apparatus; and routing the good parts and bad parts to the first and second output locations, respectively.

17. The method defined in claim 16, wherein the method further includes providing a vision inspection system with a controller and one or more cameras operably connected to the controller; and wherein the step of inspecting includes orienting the cameras to look through a transparent floor of an outer track that defines the path, and programming the controller to identify defective ones of the received parts.

18. A method of material handling for singulating, orienting, sorting and delivering parts to a downstream location for use; comprising steps of:

providing an apparatus including a part feeding device having a bowl and perimeter track;

using the part feeding device to singulate, orient and deliver oriented parts from a supply of loose non-aligned parts in the bowl along the perimeter track to a first output location for exiting the apparatus;

providing a second track with a transparent wall portion extending at least partially around the perimeter track;

receiving the oriented parts from the first output location and conveying the received parts across the transparent wall portion to a second output location for exiting the apparatus;

providing a vision inspection system with a controller and one or more cameras operably connected to the controller;

orienting the cameras to look through the transparent wall portion and programming the controller to identify defective ones of the received parts; and ejecting defective ones of the received parts downstream of the cameras.

19. A material handling apparatus comprising:

a bowl feeder for singulating, orienting and delivering oriented parts from a supply of loose non-aligned parts;

an inspection/sorting system attached to the bowl feeder, the system including a spinning ring with a transparent track member for carrying oriented parts around the bowl feeder and including at least one camera pointed at the transparent track member for viewing parts; and an ejector device operably connected to a controller that interprets data from the at least one camera and that is configured to eject from the apparatus bad ones of the received parts based on signals from the controller; and the bowl feeder further including an output location for good parts exiting the apparatus.

* * * * *